(12) United States Patent
Reisacher et al.

(10) Patent No.: US 11,331,748 B2
(45) Date of Patent: May 17, 2022

(54) METHOD FOR MACHINING A CUTTING INSERT AND CORRESPONDING DEVICE FOR MACHINING A CUTTING INSERT

(71) Applicant: SAUER GmbH, Stipshausen (DE)

(72) Inventors: Martin Reisacher, Kempten (DE); Peter Hildebrand, Pfronten (DE)

(73) Assignee: SAUER GmbH, Stipshausen (DE)

( * ) Notice: Subject to any disclaimer, the term of this patent is extended or adjusted under 35 U.S.C. 154(b) by 163 days.

(21) Appl. No.: 16/469,273

(22) PCT Filed: Dec. 8, 2017

(86) PCT No.: PCT/EP2017/081997
§ 371 (c)(1),
(2) Date: Jun. 13, 2019

(87) PCT Pub. No.: WO2018/114390
PCT Pub. Date: Jun. 28, 2018

(65) Prior Publication Data
US 2019/0351504 A1    Nov. 21, 2019

(30) Foreign Application Priority Data
Dec. 20, 2016   (DE) ............... 10 2016 225 602.5

(51) Int. Cl.
*B23K 26/00* (2014.01)
*B23K 26/03* (2006.01)
(Continued)

(52) U.S. Cl.
CPC ........ *B23K 26/0006* (2013.01); *B23K 26/032* (2013.01); *B23K 26/38* (2013.01);
(Continued)

(58) Field of Classification Search
CPC .. B23K 26/032; B23K 26/36; B23K 15/0013; B23K 26/361; B23K 2101/34;
(Continued)

(56) References Cited

U.S. PATENT DOCUMENTS

| 2003/0052104 A1 | 3/2003 | Matsumoto et al. |
| 2007/0084837 A1 | 4/2007 | Kosmowski |

(Continued)

FOREIGN PATENT DOCUMENTS

| CN | 101038285 A | 9/2007 |
| CN | 102091875 A | 6/2011 |

(Continued)

OTHER PUBLICATIONS

Office Action dated Sep. 29, 2020 for corresponding JP App. Ser. No. 2019-553634 with English language translation.

(Continued)

*Primary Examiner* — Thien S Tran
(74) *Attorney, Agent, or Firm* — Henricks Slavin LLP

(57) ABSTRACT

The invention relates to a method for machining a multi-layer workpiece blank (3) by means of a laser beam, comprising the following steps: specifying a machining program for machining the workpiece blank according to an ablation geometry in order to generate a desired edge and/or surface geometry (13) using a laser machining device; tensioning the workpiece blank in the laser machining device and positioning the workpiece holder in a measuring position; measuring a thickness of at least one of the layers of the multi-layer workpiece blank (3); modifying the machining program in order to machine the multi-layer workpiece blank (3) according to the measured layer thickness with an consistent ablation geometry; and machining the tensioned workpiece blank (3) using the modified machining program via a laser of the laser machining device (Continued)

Figure 1:
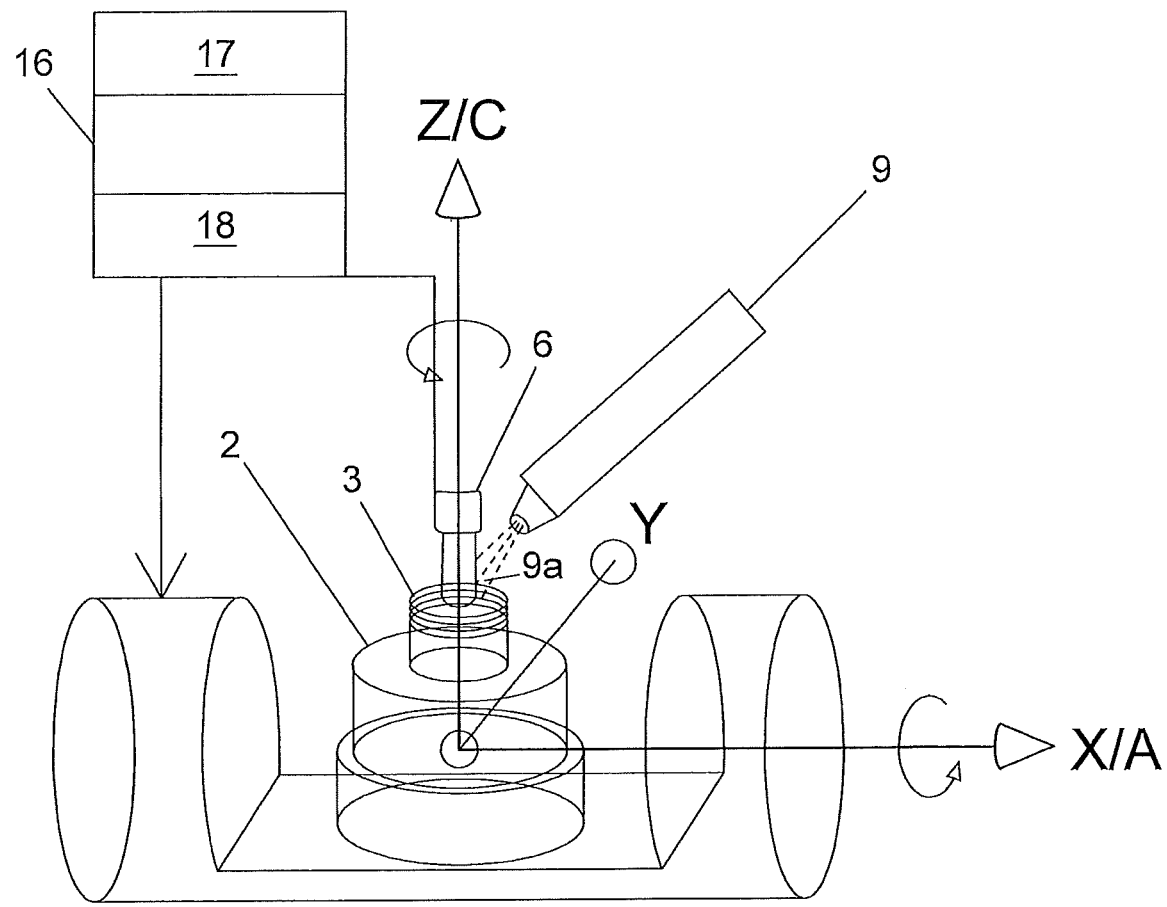

in order to generate the desired edge and/or surface geometry (13) with a cutting edge (12). The invention also relates to a correspondingly configured device.

9 Claims, 7 Drawing Sheets

(51) Int. Cl.
*B23K 26/38* (2014.01)
*B23K 26/402* (2014.01)
*B23K 103/16* (2006.01)

(52) U.S. Cl.
CPC ...... *B23K 26/402* (2013.01); *B23K 2103/172* (2018.08); *B29C 2791/009* (2013.01)

(58) Field of Classification Search
CPC ...... B23K 26/04; B23K 9/0956; B23K 26/02; B23K 37/00
See application file for complete search history.

(56) References Cited

U.S. PATENT DOCUMENTS

| | | | |
|---|---|---|---|
| 2007/0215582 | A1 | 9/2007 | Roeper et al. |
| 2011/0061591 | A1* | 3/2011 | Stecker ............ G05B 19/4099 118/663 |
| 2011/0095005 | A1 | 4/2011 | Brunner et al. |
| 2012/0000893 | A1 | 1/2012 | Broude et al. |
| 2013/0160792 | A1 | 6/2013 | Xue et al. |
| 2014/0131922 | A1* | 5/2014 | Hildebrand .......... B23K 26/082 264/400 |
| 2015/0060419 | A1* | 3/2015 | Green .................. B23K 26/032 219/121.62 |
| 2016/0193698 | A1* | 7/2016 | Hildebrand .......... B23K 26/356 219/121.69 |

FOREIGN PATENT DOCUMENTS

| | | | | |
|---|---|---|---|---|
| CN | 104842071 A | | 8/2015 | |
| DE | 202005011455 U1 | * | 10/2005 | ............ B23K 26/40 |
| DE | 202005011455 U1 | | 12/2005 | |
| DE | 102004058868 A1 | | 6/2006 | |
| DE | 10 2005 006107 A1 | | 8/2006 | |
| DE | 10 2004 058868 B4 | | 12/2006 | |
| DE | 10 2009 044316 A1 | | 5/2011 | |
| DE | 102009044316 A1 | | 5/2011 | |
| EP | 1834696 B1 | | 2/2013 | |
| JP | 2007-248461 A | | 9/2007 | |
| JP | 2011-098390 A | | 5/2011 | |
| JP | 2011-200935 A | | 10/2011 | |
| KR | 20080061372 A | | 2/2008 | |
| WO | WO 2013004850 A1 | | 1/2013 | |

OTHER PUBLICATIONS

International Search Report dated Apr. 18, 2018 for PCT App. Ser. No. PCT/EP2017/081997.
Office Action dated Oct. 29, 2020 for corresponding CN App. Ser. No. 201780079086.3 with English language translation.

* cited by examiner

METHOD FOR MACHINING A CUTTING INSERT AND CORRESPONDING DEVICE FOR MACHINING A CUTTING INSERT

The present invention relates to a method for machining a cutting insert by means of laser, in particular for edge and surface machining.

Lasers are often used in the state of the art as cutting or material machining tools.

From DE 10 2005 06 107 A1, for example, a method for cutting a workpiece by means of a laser is known. With this method, the laser power is measured and the ablation rate of the laser is adjusted on the basis of the measured laser power. This allows the ablation rate of the laser to be adjusted very precisely.

In semiconductor technology, for example, US 2007/0084837 A1 describes a process in which the layer thickness of a transparent layer applied to a metal surface is determined and the laser is controlled as a function of the layer thickness of the transparent layer in such a way that only said transparent layer is removed without damaging the underlying metal layer.

In the manufacture of cutting tools, such as cutting inserts, edge machining by means of lasers is also known from the state of the art. Such inserts often have a hard material layer consisting, for example, of a polycrystalline diamond layer (PCD) formed on a substrate. Such cutting inserts are usually workpiece blanks which are also called tool blanks according to their later intended use for end mills and the like.

For example, from DE 10 2009 044 316 A1, a method is known in which a pulsed laser is guided along the edge of a cutting insert blank and thus layer by layer is removed in order to guarantee a corresponding geometry of a cutting edge or a surface adjacent to the cutting edge.

The ablation takes place according to an ablation geometry which is previously defined in the machining program as a function of the shape of the workpiece blank and the desired geometry of the resulting cutting edge or tilted surfaces. The ablation geometry represents the difference between the workpiece blank and the geometry of the finished workpiece which has the desired free surface containing the cutting edge.

The control of the laser processing device, usually a machine tool, is also adjusted to the ablation geometry and the material properties within the framework of automated machining using the machining program. In the case of multi-layer materials, the laser parameters are determined for this purpose depending on the material layer that is currently being machined. This is necessary because the different materials react to the laser beam in different ways, depending on their properties, density, strength, absorption capacity, hardness, etc. The adaptation of the laser control to the material takes place automatically, depending on the machining position according to the specifications of the machining program, and is adapted in particular during a layer change between the different hard materials.

In practice, samples are first separated from a larger round blank and then subjected to laser machining according to the specifications of the machining program.

Thereby it has been proven in practice that problems often occur during the production of precise free-form geometries for the production of cutting surfaces.

The inventors of the present invention have therefore extensively dealt with the problem of optimizing the cutting edge quality for machining multi-layer materials by laser and for this purpose have more precisely analyzed the processes involved in machining the multi-layer material by means of laser.

Figure 5A:
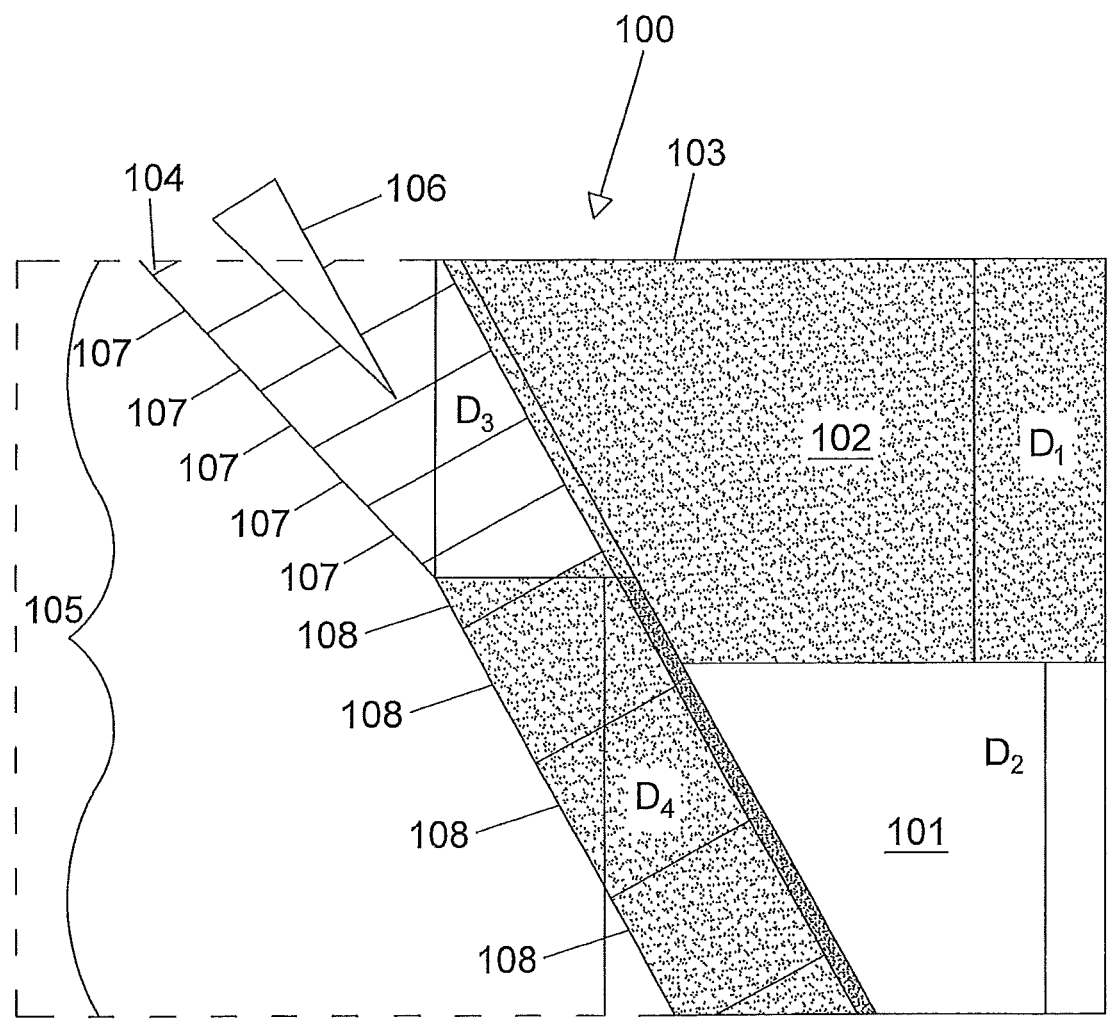
Figure 5B:
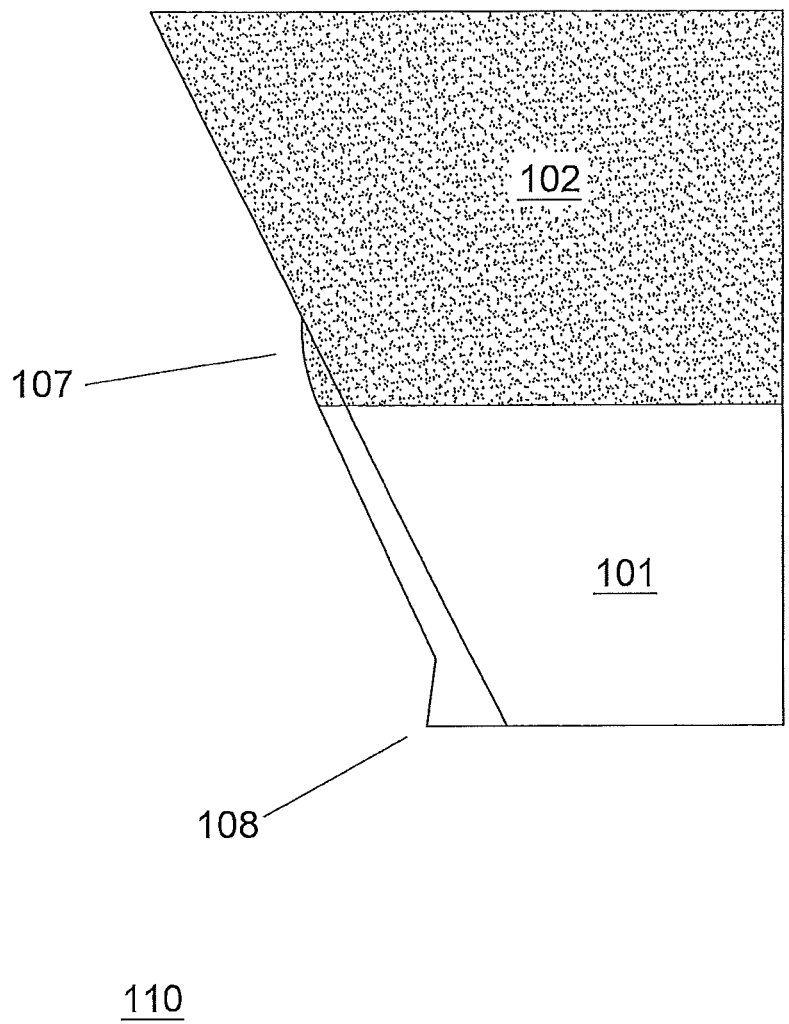

In order to explain their basic nature, the problem identified is shown in FIGS. 5a, 5b which show cross-sectional views of a cutting insert blank 100 with a hard material layer 102 applied to the surface of a base material 101.

A surface of the insert blank 100 corresponds to a preceding face of the cutting surface 103, i.e. a face which forms a cutting surface in the finished insert for machining. This preceding face of the cutting surface 103 is separated from a preceding end flank 105 via a preceding edge of the cutting edge 104.

By means of a control unit, the laser beam 106 is now guided (e.g. back and forth) along the preceding edge of the cutting edge 104 as shown in FIG. 5a in order to thus remove layer by layer at the edge, first the layers 107 and, after complete ablation of the top layer 102, layers 108 in the depth direction. As shown schematically by the dashed line in FIG. 5a, the machining can be carried out either from the solid material, with the laser cutting perpendicular to the surface. In practice, however, it is also advisable to carry out surface/edge machining by the laser at an angle from a roughly pre-cut blank.

In the example from the state of the art shown in FIGS. 5a and 5b, the layer thickness D1 of the hard material layer 102 is greater than the desired layer thickness D3 which is illustrated in the drawing by the different hatching of the layers.

Thus, the layer thickness stored in the machining program does not correspond to the actual layer thickness of the cutting insert blank to be machined 100, and the laser parameters are changed according to the specified machining program at the transition from layers 107 to 108 according to the layer thicknesses D3 or D4 stored in the original machining program, although the actual layer thicknesses are D1 or D2.

Therefore, the control unit already adapts the control, i.e. the laser guidance and/or the laser parameters of the laser 106 after ablation of some material layers along the preceding edge of the cutting edge 104, to the material properties of the base material 101, although not all hard material 102 has yet been removed. Therefore, as shown schematically in FIG. 5b, an offset 107 is created at the transition area between the hard material layer 102 and the base material 101.

A further offset 108 also occurs on the back of the cutting insert 110 because the corresponding layer thicknesses of the cutting insert blank 100 do not comply with the values stored in the machining program.

As a result, different layer thicknesses of the ablation layers 107 and 108 also result, cf. FIG. 5a, since, as mentioned above, the laser radiation interacts differently with different hard materials so that with the same laser settings, i.e. the same laser parameters, different amounts of material are removed.

Based on the problem described above, one of the objects of the present invention is to provide a method and a device for manufacturing cutting edges and free surfaces of higher quality from a workpiece blank.

In order to solve the problem described above, a method with the features of claim 1 and a device with the features of claim 8 are provided. Preferred configurations are indicated in the dependent claims.

A method according to the invention for machining a multi-layer workpiece blank by means of a laser beam comprises the steps: predetermining a machining program for machining the workpiece blank as a function of an ablation geometry to generate a desired surface and/or edge by laser machining, tensioning the workpiece blank for machining by a laser machining device and positioning the workpiece blank in a measuring position, measuring at least one thickness of a layer of the multi-layer workpiece blank, modifying the machining program for machining the multi-layer workpiece blank as a function of the measured layer thickness with consistent removal geometry and machining the tensioned workpiece blank using the modified machining program by means of laser of the laser machining device in order to generate the desired surface and/or edge geometry.

An essential aspect of the invention therefore consists of modifying an initially predetermined machining program, which already includes the ablation geometry of the workpiece based on a predetermined thickness, subsequently in the tensioned position of the workpiece blank, namely depending on the (additional) measurement of the layer thickness(es) of the workpiece blank.

This is unusual insofar as a conventional machining program already includes all the geometric information that is relevant for the ablation.

The approach according to the invention, thus, deviates from this principle of separation and generation of the machining program in a first step and tensioning and machining of the workpiece in a second step and combines these two steps by machining the tensioned workpiece blank according to a modified machining program which was modified after tensioning the workpiece and renewed measurement of the layer thickness(s) of the multi-layer workpiece blank.

Although these additional measures appear to be an effort at first glance, one of the special merits of the invention is that it has been recognized that this additional measurement in a tensioned or clamped position can also be carried out automatically without further ado and that at this stage, a simple modification of the machining program is still possible. This is possible because the same reference system of the tensioned workpiece can be used for measurement and for machine or program-controlled ablation machining by the laser.

As a result, the quality of the free surface generated can be significantly improved, since it is guaranteed that the machining program is always automatically adapted exactly to the current layer thickness. In this way, it is possible, for example, to also take into account very irregular coating thickness variations, even in an automated method. In total, this adaptation of the machining program in accordance with the "subsequent" layer thickness measurement can completely prevent or at least significantly reduce the problem described above of the formation of an offset between the adhesive layer and the base material, as shown in FIG. 5a/b, for example.

In an advantageous way, the laser parameters are adapted to the measured layer thickness as a function of the measured layer thickness in an embodiment of the present invention. These include, for example, the laser power, the laser frequency, the pulse duration and/or the speed of movement of the laser on the surface.

According to the invention, however, not only the laser parameters can be changed, but the laser guidance is also adapted in a particularly preferred embodiment. The laser track and/or focus position of the laser can also be adjusted to prevent it from running out of focus.

In a particularly preferred configuration of the method according to the invention, the thickness of the ablation layers is adjusted by the laser in the machining program. In other words, it is specifically reacted to the material change by the geometrical NC program, as an essential part of the machining program, by new layers, redefinition of the layers to be removed and their dimensions in the machining program, in response to the precisely measured layer thickness. This measure does not necessarily require an additional adjustment of the above mentioned laser parameters, which, however, can also be adjusted as far as this should be necessary when selecting the appropriate material.

At this point it should be pointed out that the basic principles of laser guidance within the framework of edge or surface machining are quite familiar to the responsible person skilled in the art. For example, reference is made at this point to the applicant's application 2013/004850 A1 describing a method for machining workpieces, in particular for the manufacture of cutting tools and the associated laser guidance, in which the laser is guided along the edge and removed layer by layer in the depth direction in accordance with the ablation geometry. A similar description of laser guidance can also be found in DE 10 2009 044 316 A1 which is also a typical example of the skilled person's average knowledge of laser control.

According to a preferred further development of the invention, the position of the tensioned cutting insert blank in relation to the coordinate system of the device can also be measured and, in addition to the position, the edge positions of the cutting insert blank can also be determined.

This position determination of the actual position of the cutting insert blank with its edge positions can be important in order to move the cutting insert blank to the corresponding nominal position in which the corresponding measurement of the layer thickness and later also the laser machining are carried out.

If the position of the cutting insert blank and its edge position are known exactly, in the following step of the layer thickness measurement, specific positions on the cutting insert blank can be measured, i.e. in particular the layer thickness of the hard material can be measured at a specific position of the preceding edge of the cutting edge.

According to a preferred embodiment of the present invention, after determining the position and the edge positions of the cutting insert blank, it can be pivoted into a measuring position, in which the layer thickness is measured essentially in view of the preceding face of the free surface, insofar as this is metrologically necessary.

Alternatively, the steps of tensioning of the workpiece and positioning in a measuring position can also be carried out in one step if the position of the tensioned or clamped workpiece blank after tensioning can already be used as the measuring position without having to additionally position the workpiece blank.

In a preferred embodiment, the layer thickness measurement and/or the position determination and/or the edge position determination of the cutting insert blank can be carried out by means of an optical measuring device.

An optical measuring device can be an optical camera, a microscope, or any other device operating by means of optical methods. Preferably, the camera can be used to determine the layer thickness on the basis of the different contrast of the layers. By means of image processing methods, the position and corresponding layer thickness are determined on the basis of the contrast of the individual layer(s).

In particular, a camera can be used which determines the corresponding position of the cutting insert blank in relation to the tensioning device and determines the corresponding edge positions in top view of the preceding face of the cutting surface. To determine the position of the edges, for example, the camera is moved along the edges of the cutting insert blank.

After this determination, preferably either the camera and/or the cutting insert blank is pivoted, preferably rotated by approx. 90° so that the camera is directed essentially perpendicular to the preceding face of the free surface and thus determines the layer thickness of the hard material layer in the area of the preceding edge of the cutting edge in an optical manner.

After determining the position of the cutting insert blank and its edges and measuring the layer thickness, the laser is then guided along the corresponding preceding edges, the position of which is now known, to generate the corresponding cutting edge.

According to a preferred further development of the method according to the invention, the layer thickness measurement can be carried out at several edge positions of the preceding edge of the cutting edge and the laser parameters can be adjusted to the average layer thickness in the measured positions or to the respective layer thickness in the corresponding position.

Accordingly, it is advantageous that not only the layer thickness is measured at one single edge position of the preceding edge of the cutting edge of the corresponding basic body, but that several edge positions are measured.

As an alternative, these determined layer thicknesses can be averaged and the information of the averaged layer thicknesses can be used for the adjustment of the laser parameters.

In order to obtain an even higher surface and/or edge quality, the laser parameters and/or laser guidance can also be changed during moving along the edge to be produced or after ablation of some layers in such a way that these are each adapted to the layer thickness in the corresponding measured positions.

According to a related aspect of the invention, a laser machining device, preferably configured as a machine tool, is also to be provided with the features of claim 7.

A laser machining device according to an invention for machining a multi-layer workpiece blank by means of a laser beam comprises a memory device for storing a predetermined machining program for machining the workpiece blank as a function of an ablation geometry for generating a desired edge and/or surface geometry by laser machining; a control unit for executing the machining program for machining the workpiece blank as a function of an ablation geometry for generating a desired edge and/or free surface geometry by laser machining; a tensioning unit for tensioning the workpiece blank; a positioning device for positioning the workpiece holder in a measuring position; a measuring device for measuring a thickness of at least one layer of the multi-layer workpiece blank; a device for modifying the machining program stored in the memory device for machining the multi-layer workpiece blank as a function of the measured layer thickness with a constant ablation geometry; and a laser device for machining the tensioned workpiece using the modified machining program by means of laser to produce the desired edge and/or surface geometry.

In a preferred embodiment, the measuring device for measuring the layer thickness and/or the laser device for machining the tensioned workpiece blank can be tilted by up to 120° in relation to the tensioning device.

The control unit can, for example, be a PC or a control unit of a machine tool, via the interface(s) of which the corresponding laser, the corresponding measuring device and the corresponding holding or provisioning devices are controlled.

The control unit may be configured to simultaneously carry out laser machining and measurement of the workpiece blank with respect to layer thickness and/or edge position and/or relative position.

In a preferred embodiment, the device for modifying the machining program stored in the memory device is configured to automatically adapt the machining program stored in the memory device to the measured layer thickness, wherein laser parameters, laser guidance, laser adjustment and/or thickness of the ablation layers are adapted by the laser as a function of the layer thickness after measurement of the layer thickness.

The positioning of the workpiece relative to the measuring system or laser which is possible by means of the device according to the invention of the 5-axis machining provides an essential advantage, since the laser machining and the measuring can be carried out in one tensioning. In this way, it is possible to first define a machining program and then subsequently adapt it to the tensioning of the workpiece directly on the machine. This eliminates the need for time-consuming re-tensioning.

Figure 2:
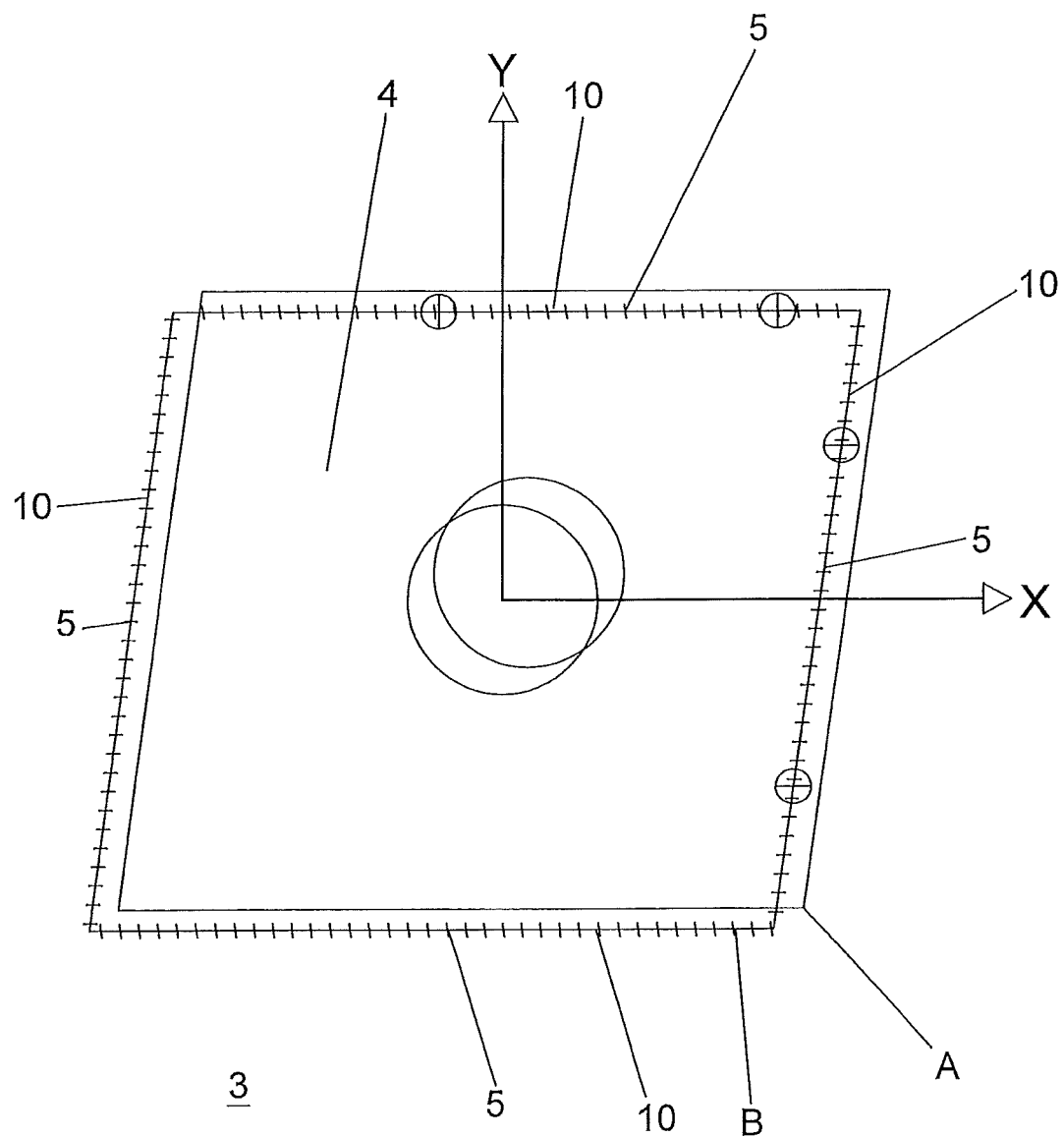
Figure 3:
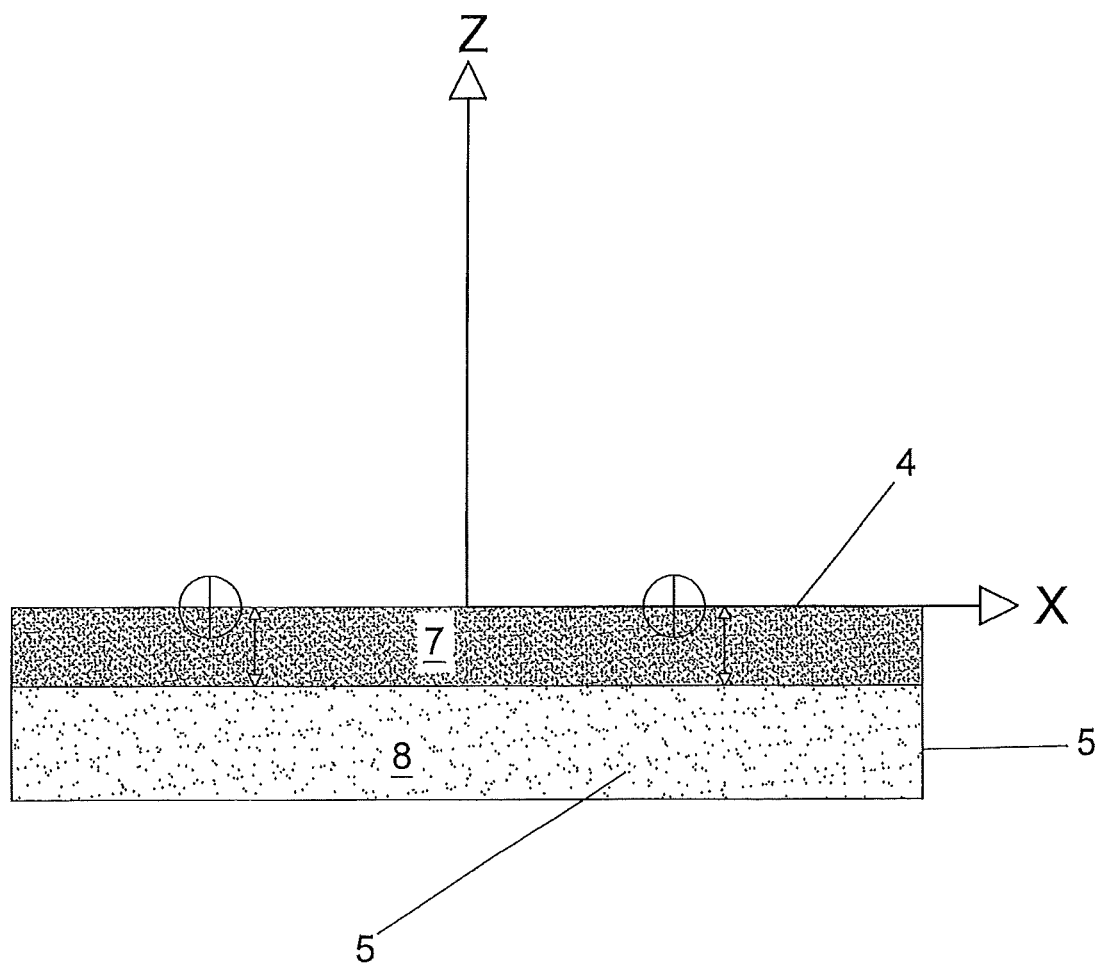
Figure 4A:
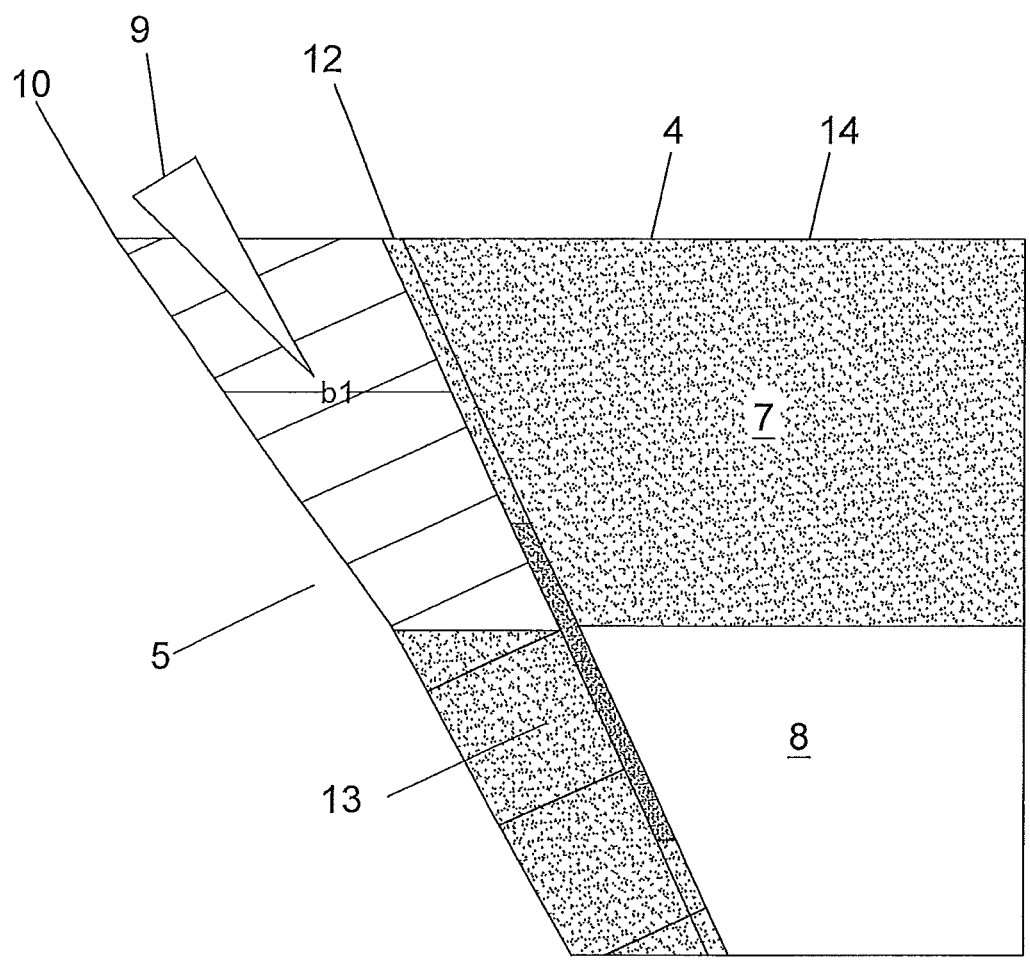

Further details and advantages of the invention result from the embodiments described below in connection with the drawing. Therein:

FIG. 1 shows a cutting insert blank tensioned on a workpiece table of a laser machining device in accordance with the invention, FIG. 2 shows a view of the cutting insert from FIG. 1, FIG. 3 shows a schematic side view of the cutting insert from FIG. 1, FIGS. 4a and b show a side view of a cutting insert blank before its edge processing (FIG. 4a) and a cutting insert after exposure of a free surface by means of a laser (FIG. 4b), FIGS. 5a and b show a side view of a cutting insert blank before its edge processing (FIG. 5a) and a cutting insert after exposure of a free surface by means of a laser (FIG. 5b) according to a method known in the state of the art.

FIG. 1 shows an embodiment of a laser machining device according to the invention for machining a multi-layer workpiece blank 3, which is tensioned on a workpiece table 2 of the laser machining device 1.

The present embodiment, the laser machining device is a machine tool which is configured for 5-axis machining. Accordingly, the three linear axes XYZ and the two rotary axes A, C are drawn in FIG. 1. The machine tool has a control unit 16 which can be used to control a machining program stored in the memory device 17 for laser machining of the insert blank by a laser 9. For this purpose, the machining program stored in the memory device 17 comprises the conventional NC program, which includes the ablation geometry, as well as the necessary laser path guidance and parameterization. The laser parameters for controlling laser settings, such as laser power, laser frequency, pulse duration and feed rate and track speed of the laser are specified according to the ablation geometry.

In FIG. 1, reference sign 6 identifies a camera which can be used to determine the position of the layers to be machined on the workpiece blank 3 and the position of the blank relative to the workpiece table. Thus, in this embodiment, the machine tool can automatically measure the position of the cutting insert blanks and simultaneously control the laser according to this position alignment. In this way, the machine tool of the present embodiment combines modern 5-axis CNC machining with laser measurement of the workpiece. In this way, the cutting edge, free angle cutting grooves in cutting inserts and end mills, especially those made of PCD or CVD, can be measured and machined in one tensioning so that the productivity is also significantly increased by the method according to the invention. With this type of machining, the free angle can be freely varied within wide limits between 9 and 35°. The minimum cutting edge radius can be up to 1 µm.

Due to the exact control according to the actually available layer thickness, optimized cutting edges without chipping result which can contribute considerably to the service life extension of the resulting tools without having to accept losses with regard to cutting edge radius or free angle.

For the purpose of adapting the machining program, the control unit has an automatic program generation device 18 which cannot only create the original machining program from 3D CAD data, but can also modify the machining program subsequently on the basis of the measured layer thicknesses, also in an automated manner.

By means of relevant image processing algorithms which are also stored in the memory device 17 and executed by the control unit 16, the correct relative cutting edge position can be determined exactly on the basis of the contrasts of the different material layers of the cutting edge blank. Due to the movability within the scope of 5-axis machining, it is possible without further ado that the cutting insert blank is tilted by 90° for measurement, so that the camera is directed directly to the side area.

FIG. 2 shows a view of the cutting insert blank from above, wherein position A corresponds to a nominal position on the workpiece table 2 and position B (edges marked with horizontal lines) corresponds to an actual position.

The image field of the camera 6 is dimensioned such that the cutting insert blank 3, i.e. the preceding face of the cutting surface 4, is scanned by means of this camera 6 or the camera is moved along the edges and the edge position and the position of the corresponding cutting insert blank 3 is determined with high accuracy by means of image processing.

After determining the position, the cutting insert blank is moved from the actual position B to the nominal position A, for example by moving or tilting the workpiece table 2.

After this, as schematically shown in FIG. 3, the camera 6 and the cutting insert blank 3 are pivoted 90° relative to each other so that the camera 6 is directed essentially perpendicular to the preceding face of the free surface 5. Both in FIG. 2 and in FIG. 3, the positions at which the respective edge or layer thickness determination is carried out with the camera are marked with a crossed circle.

The camera 6 detects the hard material layer 7 and the base material 8 by means of relevant image processing algorithms on the basis of the different contrast of these layers and the control unit can thus precisely determine the layer thickness of the hard material layer 7.

In this embodiment, the position of the cutting insert blank 3, its edge positions and the layer thickness of the hard material layer are determined by means of the same camera 6 in one tensioning of the workpiece blank.

The camera 6 can be pivotally mounted and/or the entire positioning device or only parts thereof, e.g. the workpiece table 2. This ensures that the cutting insert blank 3 can be tilted in relation to the camera 6.

After the position of the cutting insert blank 3 on the workpiece table 2 and its edge position and also its layer thickness of the hard material layer are known, a laser beam which is not shown in FIGS. 2 and 3 and which is provided with reference sign 9 in FIG. 4a is now directed from the side of the preceding face of the cutting surface 4 of the cutting insert blank 3 onto a region of the preceding edge of the cutting insert 10 (cf. FIG. 4a) and guided along the preceding edge of the cutting edge 10 substantially parallel to the preceding face of the free surface 11 (cf. FIG. 4a). Here the laser can be moved and/or the cutting insert blank can be moved using the positioning device of the workpiece table shown in FIG. 1.

FIG. 4a shows a cross-sectional view of the cutting insert blank 3, in which the preceding edge of the cutting edge 10, the preceding face of the free surface 5 and the preceding face of the cutting surface 4, which are formed on the cutting insert blank 3 at a predetermined angle prior to edge machining, are shown schematically, and the respective cutting edge 12, the free surface 13 and the cutting surface 14 which are provided in the finished cutting insert 11, are shown schematically.

As shown in FIG. 4a, the laser beam 9 is guided along the preceding edge of the cutting edge 10 (perpendicular to the paper plane) and removes material of width b1 in longitudinal direction to the preceding edge of the cutting edge 10 layer by layer (in depth direction).

When the laser arrives at the interface between the hard material layer 7 and the base material 8, the laser track, the focus position and the thickness of the ablation layer are changed on the basis of the measured layer thickness of the hard material layer 7 according to the machining program of the control unit 16 shown in FIG. 1 and adapted to the material properties of the base material 8.

Figure 4B:
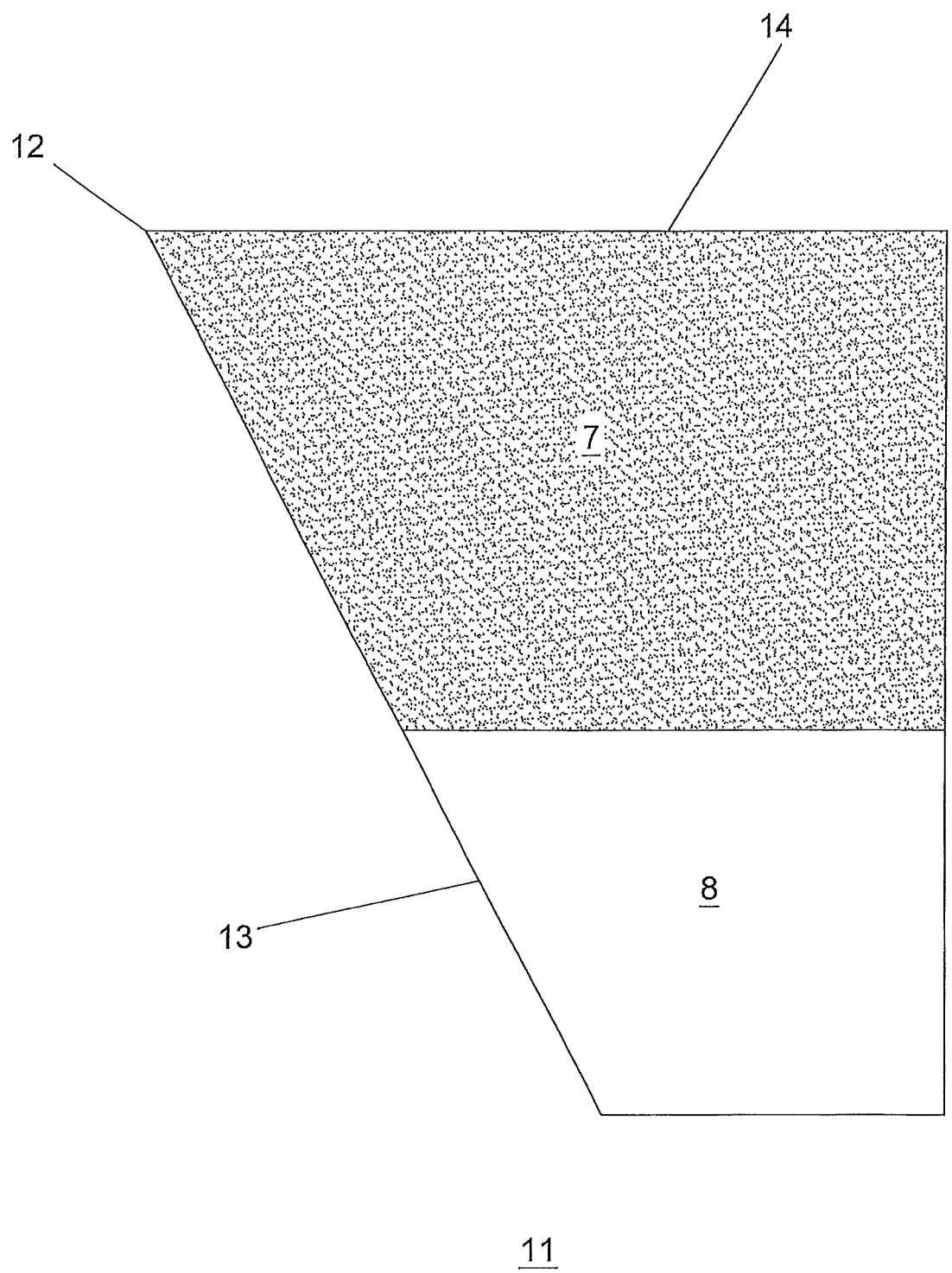

By the ablation of the material width b1, the finished cutting insert geometry 11 schematically shown in FIG. 4b in its cross-sectional view is generated with the cutting surface 14, the free surface 13, and the cutting edge 12.

By adapting the laser guidance to the respective insert blank 3 on the basis of the layer thickness information, a comparatively small offset can be generated or, as shown in FIG. 4b, an offset between hard material layer 7 and base material 8 can be completely avoided.

The hard material layer preferably consists of polycrystalline diamond, other hard materials can be: cubic BN, TiC, TiV WC, TaC. The hard material layer is preferably a ceramic layer.

A carbide metal is preferably used as the base material. Materials for the base material can be: hardened steel, high-strength alloys.

The thickness of the hard material layer is preferably between 30 and 1000 µm, in particular 50 and 800 µm, preferably 100 to 700 µm, in particular approx. 400 µm.

As an alternative to a single layer of a base material, one or more further layers may also be provided between the base material 8 and the hard material layer 7. In this case, the laser parameters or laser guidance of the machining program can be adapted to the thickness of at least one or more layers, or each corresponding layer, and an analogous procedure as described above for the two-layer material can be carried out.

REFERENCE SIGN LIST 1 edge machining device
2 workpiece table
3 workpiece blank
4 preceding face of the cutting surface
5 preceding face of the free surface
6 camera
7 hard material layer
8 base material 9 laser
9a laser beam
10 preceding edge of the cutting edge
11 cutting insert
12 cutting edge
13 free surface
14 cutting surface
15 interface
16 control unit
17 memory device
18 machining program generation device
100 cutting insert blank
101 base material layer
102 hard material layer
103 preceding face of the cutting surface
104 preceding edge of the cutting edge
106 laser beam
107 offset
108 offset
B actual position
A nominal Position
b1 material width

The invention claimed is:

1. Method for machining a multi-layer cutting insert blank (3), including a base material coated with a hard material, with a laser beam of a laser machining device, comprising:
specifying a predetermined machining program for machining the multi-layer cutting insert blank according to an ablation geometry based on a thickness of a premeasured layer of the multi-layer cutting insert blank (3) in order to generate a desired edge and/or surface geometry (13), having a cutting edge (12), with the laser machining device;
tensioning the multi-layer cutting insert blank in the laser machining device;
determining an edge position of the tensioned multi-layer cutting insert blank with a measuring device;
positioning the tensioned multi-layer cutting insert blank in a measuring position;
remeasuring a thickness of at least the premeasured layer of the tensioned and positioned multi-layer cutting insert blank (3) after determining the edge position of the tensioned multi-layer cutting insert blank;
modifying the predetermined machining program in order to machine the tensioned multi-layer cutting insert blank (3) according to the remeasured layer thickness and the ablation geometry; and
machining the tensioned multi-layer cutting insert blank (3) with the laser beam of the laser machining device using the modified machining program in order to generate the desired edge and/or surface geometry (13) with the cutting edge (12);
wherein the remeasuring and machining steps are carried out in the same edge position of the tensioned multi-layer cutting insert blank.

2. Method according to claim 1, wherein the step of modifying the predetermined machining program comprises adapting laser control parameters of the laser machining device to the remeasured layer thickness.

3. Method according to claim 2, wherein the step of modifying the predetermined machining program comprises adapting laser focusing as a function of the remeasured layer thickness such that the laser beam does not run out of focus.

4. Method according to claim 1, wherein the step of modifying the predetermined machining program comprises adapting one or more laser control parameters and/or laser guidance as a function of the remeasured layer thickness.

5. Method according to claim 1, wherein the step of modifying the predetermined machining program comprises adjusting a thickness of an ablation layer to be ablated by the laser beam.

6. Laser machining device for machining a multi-layer cutting insert blank, including a base material coated with a hard material, with a laser beam, comprising:
a memory device configured to store a predetermined machining program for machining the multi-layer cutting insert blank according to an ablation geometry based on a thickness of a premeasured layer of the multi-layer cutting insert blank in order to generate a desired edge and/or surface geometry by laser machining;
a workpiece holder configured to tension the multi-layer cutting insert blank;
one or more controllable axes configured to position the workpiece holder with the tensioned cutting insert blank in a measuring position;
a measurement device configured to remeasure a thickness of at least the premeasured layer of the multi-layer cutting insert blank after the multi-layer cutting insert blank has been tensioned and to determine an edge position of the tensioned multi-layer cutting insert blank;
a control unit configured to modify the predetermined machining program stored in the memory device in accordance with the remeasured layer thickness with the ablation geometry and to execute the modified machining program according to the ablation geometry to generate the desired edge and/or surface geometry by laser machining; and
a laser device configured to machine the tensioned multi-layer cutting insert blank, using the modified machining program, with the laser beam to generate the desired edge and/or surface geometry (12, 13).

7. Laser machining device according to claim 6, wherein the measurement device and/or the laser device is tiltable relative to the workpiece holder by an angular load of up to 120°.

8. Laser machining device according to claim 6, wherein the laser machining device is configured to simultaneously perform the measuring of the thickness of the premeasured layer of the multi-layer cutting insert blank and the machining of the tensioned multi-layer cutting insert blank with the laser beam with respect to the remeasured layer thickness and/or edge position and/or relative position.

9. Laser machining device according to claim 7, wherein the control unit is configured to automatically adapt the machining program stored in the memory device (17) to the remeasured layer thickness, and wherein laser control parameters, laser guidance, laser setting and/or thickness of the ablation layers are adapted in accordance with the remeasured layer thickness.

* * * * *